(12) United States Patent
Chang et al.

(10) Patent No.: US 6,406,628 B1
(45) Date of Patent: Jun. 18, 2002

(54) METHOD FOR REMOVING NITROGEN AND PHOSPHOROUS IN WASTEWATER

(75) Inventors: Ho Nam Chang, Seoul; Seong Jin Lim; Sun Hoon Kwon, both of Taejon; Woo Gi Lee; Dong Won Choi, both of Seoul, all of (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 0 days.

(21) Appl. No.: 09/398,390

(22) Filed: Sep. 17, 1999

(30) Foreign Application Priority Data

Sep. 24, 1998 (KR) .............................. 98-39798

(51) Int. Cl.$^7$ .................................. C02F 3/00
(52) U.S. Cl. ........................ 210/605; 210/787
(58) Field of Search ................... 210/605, 787

(56) References Cited

U.S. PATENT DOCUMENTS

| | | | | |
|---|---|---|---|---|
| 5,182,021 | A | * | 1/1993 | Spector |
| 5,792,355 | A | * | 8/1998 | Desjardins |
| 5,853,589 | A | * | 12/1998 | Desjardins |
| 5,902,484 | A | * | 5/1999 | Timpany |
| 6,015,496 | A | * | 1/2000 | Khudenko |
| 6,262,313 | B1 | * | 7/2001 | Holtzapple |

OTHER PUBLICATIONS

P. Pavan, et al., "Effect of Addition of An Aerobic Fermented OFMSW (Organic Fraction of Municipal Sold Waste) on Biological Nutrient Removal (BNR) Process: Preliminary Results", Wat, Sci. Tech., 38(1):327–334(1998).

H.D. Monteith, et al., "Industrial Waste Carbon Sources for Biological Denitrification", Prog. Wat. Tech., 12, Toronto:127–141(1980).

P. Llabres et al., "The Use of Organic Fraction of Municipal Solid Waste Hydrolysis Products for Biological Nutrient Removal in Wastewater Treatment Plants", Wat. Res., 33(1):214–222(1999).

N. Bernet et al."Use of Industrieal Effluent as a Carbon Source for Denitrification of a High–Strength Wastewater", Appl. Microbiol. Biotechnol., 46:92–97(1996).

F. Cecchi et al., "An Aerobic Digestion of OFMSW(Organic Fraction of Municipal Solid Waste) and BNR(Biological Nutrient Removal) Processes: A Possible Integration—Preliminary Results", Wat. Sci. Tech., 30(8):65–72(1994).

L.H. Lötter and A.R. Pitman, "Improved Biological Phosphorus Removal Resulting from the Enrichment of Reactor Feed with Fermentation Products", Wat. Sci. Tech., 26(5–6):943–953(1992).

* cited by examiner

*Primary Examiner*—Chester T. Barry
(74) *Attorney, Agent, or Firm*—Darby & Darby

(57) ABSTRACT

The present invention provides to a method for removing nitrogen and phosphorous in wastewater simultaneously from wastewater by employing fermentation broth obtained by anaerobic fermentation of organic solid wastes. The method for removing nitrogen and phosphorous in wastewater of the invention comprises the steps of subjecting organic waste material to anaerobic fermentation at 30 to 40° C. for 2 to 4 days by using anaerobic sludge to obtain fermentation broth; and, adding the fermentation broth to a sequencing batch reactor with alternating anaerobic-aerobic-anoxic cycles under anaerobic and anoxic conditions in a separate manner. In accordance with the present invention, nitrogen in the influent wastewater can be removed more than 95% in total and phosphorous concentration can be kept below 1 ppm regardless of the concentration of organic materials in the influent wastewater. Further, the present method requires no extra pretreatment steps or chemicals which are essential to remove residual ammonia nitrogen in the prior art systems, and lowers the overall cost for wastewater treatment due to the usage of organic waste materials.

3 Claims, 1 Drawing Sheet

METHOD FOR REMOVING NITROGEN AND PHOSPHOROUS IN WASTEWATER

FIELD OF THE INVENTION

The present invention relates to a method for removing nitrogen and phosphorous in wastewater, more specifically, to a method for removing nitrogen and phosphorous simultaneously from wastewater by employing fermentation broth obtained by anaerobic fermentation of organic waste materials.

BACKGROUND OF THE INVENTION

The presence of nitrogen and phosphorous compounds in wastewater is one of the primary causes of eutrophication of lakes and rivers. However, since most wastewater treatment plants are concentrated on removing organic compounds, it is urgently necessary to develop new and efficient treatment systems or facilities for the removal of nitrogen and phosphorous compounds.

In general, removal of nitrogen compounds in the wastewater can be achieved in a two-step biological reaction: The first step is nitrification by the autotrophs which converts ammonia nitrogen into nitrite and nitrate under aerobic condition; and, the second step is denitrification by the heterotrophs which reduce oxidized nitrogen compounds into nitrogen gas under anoxic condition(see: Castens, D. J. and Rozich, A. F., Biotechnol. Bioeng., 18:461–465(1985)), which requires organic carbon compounds as electron donors. However, since the wastewater does not contain sufficient organic carbon compounds, addition of organic carbon compounds to the wastewater treatment system is indispensable for the complete removal of nitrogen. In this regard, several organic carbon compounds such as methanol, glucose and acetate, have been tested as a carbon source, and acetate is known to be the most effective compound among them (see: Tom N.F.Y., Wong Y. S. and Leung G., Wat. Res., 26(9):1229–1236(1992)). Although methanol is more frequently used as the electron donor due to its inexpensive cost, it is urgent to find a new alternative carbon compound for the methanol, as an effort to reduce operation cost in the wastewater treatment plants.

Under the circumstances, several attempts have been made to use various industrial wastes in the art(see: Skrinde J. R. and Bhagat S. K., J. WPCF, 54(1):370–377(1982); N. Bernet, et al., Appl. Microbiol. Biotechnol., 46:92–97 (1996)). However, the industrial wastes have revealed some shortcomings in the senses that: they do not contain proper organic compounds necessary for denitrification; the components in the wastes are not consistent or reliable; and, they tend to contain non-degradable compounds. Furthermore, since the industrial plants, in most cases, are located far away from the wastewater treatment plants, the cost for transportation prevents the actual use of the processes.

On the other hand, removal of phosphorous can be achieved by the aid of microorganisms, which secrete phosphate as they store organic materials under anaerobic condition, but accumulate phosphate as polyphosphates under aerobic condition(see: Levin G. V. and Shapiro J., J. WPCF., 37:800(1965)). By alternating anaerobic/aerobic conditions, phosphorous uptake by the microbes can be accelerated. Since these polyphosphates accumulating microbes require short chain fatty acid as a carbon source, the influent wastewater composition is one of the most important factors for the efficient phosphate removal from wastewater.

Currently known processes for simultaneous removal of nitrogen and phosphorous includes A2/0 process, five-stage Bardenpho process, UCT(University of Cape Town) process, and VIP(Virginia Initiative Plants). These processes are modified processes of conventional activated sludge methods and differ in their arrangement and flow of the processes of aerobic, anaerobic and anoxic conditioned reactors(see: Tchobanoglous G. and Burton F. L., Wastewater Engineering, $3^{rd}$ ed., McGraw-Hill(1991)). They all utilize organic materials in the influent wastewater, so that without additional carbon source the nitrogen in the wastewaters cannot be removed lower than a certain limit.

Japanese patent publication No. 82-12437 discloses a method for the simultaneous removal of nitrogen and phosphorous by using organic acids obtained from biologically treated sludge. However, since the nitrogen and phosphorous contents in the sludge are as high as 10% and 2.2%, it has limits on the efficient removal of nitrogen and phosphorous from wastewater.

Russian patent No. 1,255,587 also describes a method for removing nitrogen by using organic acid obtained from organic waste, though it has the same problems as the one in Japan.

Korean patent laid-open publication No. 95-212 describes a method for production of organic acids by anaerobic fermentation of solid waste separated from the influent wastewater. The prior art method is, however, proven to be less satisfactory in the senses that: it requires additional reactors to remove ammonia nitrogen; and, it is ineffective in phosphorous removal. Also, Korean patent laid-open publication No. 95-8039 discloses a denitrification process, which employs anaerobic fermentation broth from the mixture of settled solid waste and surplus sludge in the wastewater treatment plant. However, since the fermentation broth contains high levels of nitrogen and phosphorous, it is essentially required to add chemicals such as MgO to remove nitrogen and phosphorous.

Accordingly, there are strong reasons for developing an economical and efficient method for removing nitrogen and phosphorous compounds from wastewater, which can solve the various problems of previous systems.

SUMMARY OF THE INVENTION

In accordance with the present invention, the inventors have tried to develop a novel method for removing nitrogen and phosphorous from wastewater in an economical and efficient manner, and found that nitrogen and phosphorous can be removed simultaneously by using anaerobic fermentation broth of organic wastes with low nitrogen and phosphorous contents.

A primary object of the invention is, therefore, to provide a method for removing nitrogen and phosphorous in wastewater.

The other object of the invention is to provide a fermentation broth with low nitrogen and phosphorous contents, which is obtained by anaerobic fermentation of organic solid wastes.

BRIEF DESCRIPTION OF DRAWINGS

The above and the other objects and features of the present invention will become apparent from the following descriptions given in conjunction with the accompanying drawings, in which.

DETAILED DESCRIPTION OF THE INVENTION

Figure 1:
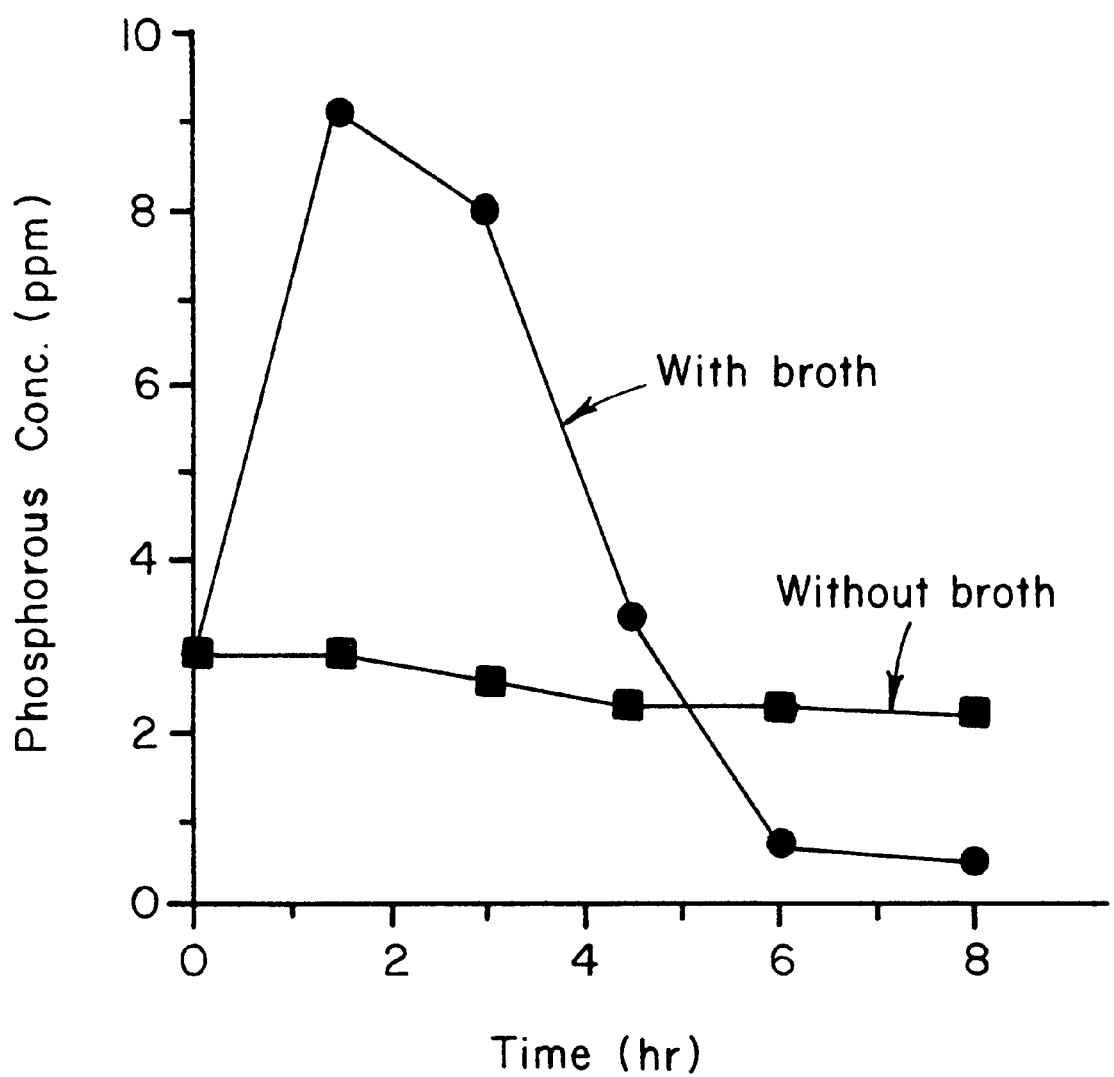
FIG. 1 is a graph showing the effect of phosphorous removal with or without fermentation broth.

In accordance with the present invention, the method or removing nitrogen and phosphorous in wastewater comprises the steps of:

(i) subjecting organic waste material to anaerobic fermentation at 30 to 40° C. for 2 to 4 days by using anaerobic sludge to obtain fermentation broth; and,
(ii) adding the fermentation broth to a sequencing batch reactor with alternating anaerobic-aerobic-anoxic cycles under anaerobic and anoxic conditions in a separate manner.

The resulting fermentation broth containing organic acids whose carbon number is 2 to 6 was mixed with wastewater for further processing for nitrogen and phosphorous removal.

The method for removing nitrogen and phosphorous from wastewater by employing fermentation broth of organic waste with low nitrogen and phosphorous contents is described in more detail.

Step 1: Fermentation of Organic Wastes Under Anaerobic Condition

Anaerobic sludge is obtained from anaerobic treatment tank of wastewater treatment plant and adapted for anaerobic fermentation. The sludge is mixed with one of the following solid wastes, such as food waste, grass, wastepaper, and fermented under anaerobic condition at 30 to 40° C. for 2 to 4 days. The fermentation broth is separated from settled materials. This fermentation broth contains 3–30 g/l of organic acids of 2–6 carbons such as acetate, propionate and butyrate that are necessary for the nitrogen and phosphorous removal reactions. In addition, the fermentation broth of organic waste is low in nitrogen and phosphorus concentrations and does not require further pretreatment of chemicals.

Step 2: Removal of Nitrogen and Phosphorous by Using the Fermentation Broth

The fermentation broth is added to a sequencing batch reactor with alternating anaerobic-aerobic-anoxic cycles under anaerobic and anoxic conditions. Under the anaerobic condition, phosphorous is secreted from the phosphorous accumulating microbes. Under the subsequent aerobic condition, phosphorous is taken up by the phosphorous accumulating microbes more than they have secreted in the previous reaction, and nitrifying bacteria oxidizes ammonia nitrogen. Under the final anoxic condition, oxidized nitrogen is converted into nitrogen gas by denitrifying bacteria. In this Step, the removal of nitrogen and phosphorous can be achieved in one reactor simultaneously.

In the case of nitrogen, addition of the fermentation broth to be 1–8 ppm, preferably 2.5–5.5 ppm of wastewater COD per 1 ppm of oxidized nitrogen, under anoxic condition, allows the removal of 95% of nitrogen oxidized in aerobic condition by the conversion into nitrogen gas. The efficiency of denitrification can vary depending on the mixing ratio of fermentation broth. The denitrification efficiency lowers when COD of wastewater is below 1.0 ppm per 1 ppm of oxidized nitrogen content. If the ratio of COD to oxidized nitrogen is above 8.0, there is little increase in denitrification. Therefore, the addition of fermentation broth should be adjusted to be from 1.0 to 8.0 ppm of wastewater COD per 1 ppm of oxidized nitrogen after adding the fermentation broth, and more preferably from 2.5 to 5.5 ppm.

On the other hand, phosphorous is efficiently removed even when the wastewater COD is low. When fermentation broth is added to the wastewater with low COD, a typical secretion and over-uptake of phosphorous by the microbes occurs and phosphorous is removed very efficiently. The ratio of fermentation broth to wastewater depends on the phosphorous content. If the wastewater COD is below 10 ppm per 1 ppm phosphorous after addition of the fermentation broth, the efficiency of phosphorous removal is reduced, and if above 70 ppm, there is little increase in the phosphorous removal. Therefore, the addition of fermentation broth should be adjusted to be from 10 to 70 ppm COD per 1 ppm phosphorous after adding the fermentation broth, and more preferably from 20 to 40 ppm.

The present invention is further illustrated in the following examples, which should not be taken to limit the scope of the invention.

EXAMPLE 1

Anaerobic Fermentation of Organic Waste Materials

Food wastes consisting of about 48% carbon, 4% nitrogen and 1.5% phosphorous were used as an organic waste material for fermentation broth. In a 2 liter flask, 15 g of dried food wastes were mixed with 1 liter of anaerobic sludge obtained from a wastewater treatment plant located in Taejon, Korea, and adjusted the total volume to 1.8 liter. The mixture was incubated at 35° C. incubator for 3 days. The liquefied mixture was then centrifuged and the supernatant of fermentation broth was collected. The composition of the resulting fermentation broth was analyzed by RI detector installed HPLC(L-6000, Hitachi, Japan) and Aminex HPX-87H (Richmond, BioRad Co., USA) column, whose results are shown in Table 1 below.

TABLE 1

Composition of fermentation broth of organic waste

| Components | Concentration(g/l) | % of Total Acids |
|---|---|---|
| Acetic acid | 3.1 | 43 |
| Propionic acid | 1.3 | 18 |
| Butyric acid | 2.81 | 39 |
| Total acids (content) | 7.21 | 100 |
| COD, ppm | | 10,800 |
| Nitrogen in Ammonia, ppm | | 180 |
| Phosphorous in Inorganic acid, ppm | | 80 |

As can be seen in Table 1, the fermentation broth of organic waste materials contained 7.21 g/l of organic acids such as acetate, propionate and butyrate, and 180 ppm and 80 ppm of nitrogen and phosphorous, respectively.

EXAMPLE 2

Removal of Phosphorous by Using Fermentation Broth of Organic Wastes

By utilizing the above fermentation broth of organic waste, phosphorous removal from the influent wastewater of a wastewater treatment plant was tested. In a sequencing batch reactor (SBR, 30 liter) with anaerobic-aerobic-anoxic (3 hr-3 hr-2 hr) cycles, 200 ml of fermentation broth of organic waste was added into wastewater under anaerobic condition. The resulting COD was 66.7 ppm(the phosphorous concentration was about 3 ppm, and the fermentation broth was added to be about 20 ppm COD/1 ppm phosphorous). The total amount of nitrogen and phosphorous was assayed by using the standard method in the art(7th ed., APHA-AWWA-WDCF). COD was assayed by the potassium dichromate method, and the secretion and uptake of phosphorous were assayed by measuring $PO_4^{3-}$ at different time interval in Eutrophication meter(HC-1000, Central Kagaku, Japan). The phosphorous removal in the presence and absence of fermentation broth was shown in FIG. 1. As shown in FIG. 1, in the absence of fermentation broth, there was no removal of phosphorous. In the presence of fermentation broth, phosphorous in the wastewater was increased under anaerobic condition due to the secretion of phosphate, but decreased under aerobic condition due to over-accumulation by the phosphorous accumulating microbes. The phosphorous concentration in the effluent wastewater was kept consistently below 1 ppm regardless of the concentration of organic materials in the influent wastewater.

EXAMPLE 3

Removal of Nitrogen by Using Fermentation Broth of Organic Wastes

Nitrogen removal from the influent wastewater of Taejon wastewater treatment plant was tested in an analogous manner as in Example 2. In a sequencing batch reactor(SBR, 30 liter) with anaerobic-aerobic-anoxic(3 hr-3 hr-2 hr) cycles, 300 ml of fermentation broth of organic waste was added into wastewater under anoxic condition. The resulting COD was 100 ppm(the oxidized nitrogen concentration was about 22 ppm under aerobic condition, and the fermentation broth was added to be about 5 ppm COD/1 ppm nitrogen). The total amount of nitrogen and phosphorous was assayed by using the standard method in the art($7^{th}$ ed., APHA-AWWA-WDCF). COD was assayed by the potassium dichromate method, and nitrification and denitrification were assayed by measuring $NO_2^-$, $NO_3^-$ and $NH_4^+$ at different time interval in Eutrophication meter(HC-1000, Central Kagaku, Japan), whose results are shown in Table 2 below.

TABLE 2

Comparison of nitrogen removal efficiencies

| | Total Nitrogen in Influent (ppm) | Oxidized Nitrogen to $No_3^-$ (ppm) | Denitrified $No_3^-$ (ppm) | Total Nitrogen in Effluent (ppm) | COD of Effluent (ppm) | % Removal of Nitrogen |
|---|---|---|---|---|---|---|
| Without Broth | 35 | 23 | 2 | 21 | 5 | 40 |
| With Broth | 35 | 22 | 21.5 | 1.5 | 7 | 95.7 |

As shown in Table 2 above, in the absence of fermentation broth, organic materials in the influent water were all used up under anaerobic condition so that there was no reduction of oxidized nitrogen into nitrogen gas. In the presence of fermentation broth, most of oxidized nitrogen was reduced to nitrogen gas. Although there was ammonia nitrogen in the fermentation broth, it did not affect overall nitrogen removal efficiency.

EXAMPLE 4

Simultaneous Removal of Nitrogen and Phosphorous by Using Fermentation Broth of Organic Wastes To remove nitrogen and phosphorous simultaneously from the influent wastewater of wastewater treatment plant, fermentation broth prepared in Example 1 was added in two steps. In a sequencing batch reactor(SBR, 30 liter) with anaerobic-aerobic-anoxic(3 hr-3 hr-2 hr) cycles, 200 ml of fermentation broth of organic wastes was first added under anaerobic condition and another 300 ml of fermentation broth under anoxic condition, respectively. The total amount of nitrogen and phosphorous, COD and nitrification and denitrification were assayed in an analogous manner as in Examples 2 and 3, whose results are shown in Table 3 below.

TABLE 3

Simultaneous removal of nitrogen and phosphorous by using fermentation broth

| | Total Nitrogen in Influent (ppm) | Total Nitogen in Effluent (ppm) | % Removal of Nitogen | Total Phosphorous in Influent (ppm) | Total Phosphorous in Effluent (ppm) | % Removal of Phosphorous |
|---|---|---|---|---|---|---|
| Without Broth | 35 | 22 | 37.1 | 3.8 | 2.2 | 42.1 |
| With Broth | 35 | 1.5 | 95.7 | 3.8 | 0.75 | 80.3 |

As shown in Table 3, the efficiency of simultaneous removal of nitrogen and phosphorous was same as the independent removal of each nitrogen and phosphorous and it was possible to keep phosphorous level below 1 ppm in the effluent wastewater and to remove more than 95% nitrogen from the influent wastewater.

As clearly illustrated and demonstrated as the above, the present invention provides a method for removing nitrogen and phosphorous in wastewater simultaneously by using anaerobic fermentation broth of organic wastes with low nitrogen and phosphorous contents. In accordance with the present invention, nitrogen in the influent wastewater can be removed more than 95% in total and phosphorous concentration can be kept below 1 ppm regardless of the concentration of organic materials in the influent wastewater. Further, the present method requires no extra pretreatment steps or chemicals that are essential to remove residual ammonia nitrogen in the prior art systems, and lowers the overall cost for wastewater treatment due to the usage of organic waste materials.

What is claimed is:

1. A method for removing nitrogen and phosphorous in wastewater simultaneously, which comprises the steps of:
   (i) mixing organic waste material and anaerobic sludge to form a mixture;
   (ii) incubating the mixture at 30 to 40° C. for 2 to 4 days to enable the organic waste material to be fermented by the anaerobic sludge and to form a fermented mixture;
   (iii) centrifuging the fermented mixture to remove settled material and to obtain a fermentation broth; and
   (iv) adding the fermentation broth to a sequencing batch reactor containing wastewater with alternating anaerobic-aerobic-anoxic cycles under separate anaerobic and anoxic conditions.

2. The method of claim 1, wherein the organic waste material is selected from the group consisting of food waste, grass, wood waste, dried rice plant and paper waste.

3. A method for removing nitrogen and phosphorous in wastewater simultaneously, which comprises the steps of:
   (i) mixing organic waste material and anaerobic sludge to form a mixture;
   (ii) incubating the mixture at 30 to 40° C. for 2 to 4 days to enable the organic waste material to be fermented by the anaerobic sludge and to form a fermented mixture;

(iii) centrifuging the fermented mixture to remove settled material and to obtain a fermentation broth; and (iv) adding the fermentation broth to a sequencing batch reactor containing wastewater with alternating anaerobic-aerobic-anoxic cycles under separate anaerobic and anoxic conditions, wherein the fermentation broth is added under anaerobic conditions to the wastewater to be 10–70 ppm of wastewater COD per 1 ppm of phosphorous after adding the fermentation broth, and under anoxic conditions to be 1–8 ppm of wastewater COD per 1 ppm of oxidized nitrogen after adding the fermentation broth.

* * * * *